Figure 1:
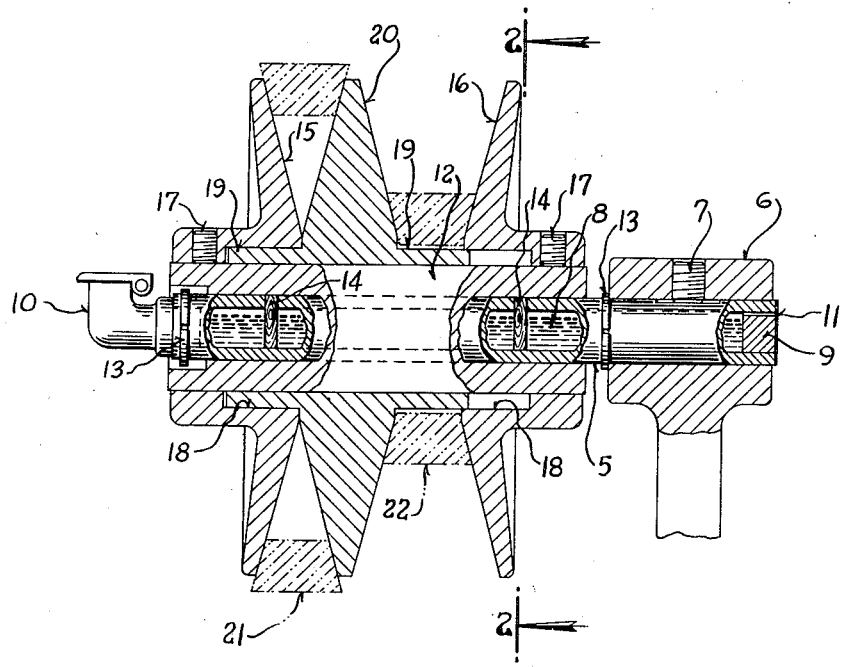

April 4, 1950        C. McLEAR        2,502,976

VARIABLE SPEED PULLEY

Filed Dec. 1, 1948

Inventor
Charles McLear
By Ira Milton Jones
Attorney

Patented Apr. 4, 1950

2,502,976

UNITED STATES PATENT OFFICE 2,502,976

VARIABLE SPEED PULLEY

Charles McLear, Des Plaines, Ill., assignor to The DoAll Company, Des Plaines, Ill., a corporation of Illinois Application December 1, 1948, Serial No. 62,833

2 Claims. (Cl. 308—104)

This invention relates to variable speed pulleys and refers more particularly to pulleys wherein a variation in ratio between driving and driven speeds is obtained through axial shifting of an intermediate double cone-faced sheave between two outer single cone-faced sheaves in fixed axially spaced relation. United States Letters Patent No. 2,151,189 issued to L. Coddington illustrates an early construction of this type.

One of the disadvantages of such pulleys heretofore in use was the fact that dirt and dust could reach the bearing surfaces along which the intermediate pulley should be free to slide. As a consequence, the intermediate pulley very often would become jammed, making speed variation impossible. In fact the parts would become so tightly frozen that even the use of an arbor press would not free them.

It is therefore an object of this invention to improve the construction of variable speed pulleys of this type with a view toward preventing the entrance of dust and foreign matter to the inner bearing surfaces of the pulley.

Another object of this invention is to provide increased rigidity for the mounting of the intermediate double cone-faced pulley sheave.

Another object of this invention is to utilize part of the means employed to prevent the entry of dust and foreign matter to lengthen the bearing of the intermediate sheave and thus provide a more rigid mounting for the intermediate sheave.

Another object of this invention is to provide a variable speed pulley of the character described wherein the outer sheaves are adjustably mounted so that the spacing between sheaves can be regulated to permit the belts used with the pulley to operate in the most favorable positions and to provide means for compensating for variations in belt widths.

Another object of this invention is to provide a pulley of the character described having means incorporated therein by which the entire pulley unit is free to float axially between defined limits.

Another object of this invention is to provide improved means for maintaining the bearing surfaces of the pulley lubricated.

A further object of this invention is to provide a pulley of the character described which is simple to manufacture, assemble and maintain in effective working condition.

With the above and other objects in view, which will appear as the description proceeds, this invention resides in the novel construction, combination and arrangement of parts substantially as hereinafter described and more particularly defined by the appended claims, it being understood that such changes in the precise embodiment of the hereindisclosed invention may be made as come within the scope of the claims.

Figure 2:
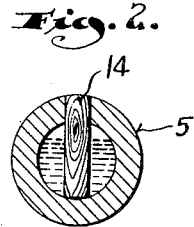

The accompanying drawing illustrates one complete example of the physical embodiment of the invention constructed according to the best mode so far devised for the practical application of the principles thereof, and in which:

Figure 1 is a longitudinal sectional view through a pulley constructed in accordance with this invention; and Figure 2 is a sectional view through the shaft of the pulley, taken along the line 2—2 of Figure 1.

Referring now more particularly to the accompanying drawing, the numeral 5 designates the main supporting shaft for the pulley which is secured in a supporting member 6 by any suitable means, such as a set screw 7. The shaft 5 is formed from a piece of steel tubing, the hollow interior being utilized as an oil storage reservoir 8 to facilitate lubrication. A suitable plug 9 at one end of the shaft seals the same against leakage of oil from the reservoir, and a suitable oil fitting 10 at the other end of the shaft enables the reservoir to be filled. The neck of the oil fitting has the same diameter as the plug 9, so that the oil fitting and plug may be installed, respectively, at opposite ends of the shaft from those shown, thus enabling the oil reservoir to be in effect reversed end-for-end.

A small vent hole 11 in the plug 9 provides for the escape of displaced air during filling of the reservoir, and it will be seen that because the filler cap neck is turned upwardly and the vent hole 11 is disposed at the top of the plug 9, the reservoir may be filled to within a small distance of its top so that the pulley unit of this invention will not require frequent attention.

A sleeve 12 is freely rotatably and slidably mounted on the shaft, its longitudinal movement being held within limits defined by a pair of snap rings 13. The entire pulley assembly is thus free to float axially to insure correct traction of the belts in the pulleys.

A pair of wooden wicks 14, press fitted into holes in the wall of the shaft 5, extend down into the reservoir, to the bottom thereof, and by capillary attraction draw oil therefrom to provide lubrication between the shaft and the sleeve 12.

Adjustably secured to the ends of the sleeve 12 are opposed outer cone-faced sheaves 15 and 16. Set screws 17 provide means for locking the sheaves to the sleeve in different positions of adjustment. The hubs of the sheaves 15 and 16 have relatively long counterbores 18 opening to their inner faces adjacent to the small diameters of the cones. These long counterbores cooperate with tubular extensions 19 projecting from the opposite sides of an intermediate double cone-faced sheave 20 to provide telescoping labyrinth seals. The tubular extensions 19 also materially increase the length of the bearing by which the intermediate sheave 20 is slidably mounted on the sleeve 12.

Attention is directed to the fact that even with the outer sheaves 15 and 16 adjusted to their maximum spacing, a sufficient overlap exists between the counterbores 18 and the hub extensions 19 to guard against the entrance of dust and foreign matter to the bearing surfaces between the sleeve and the hub of the intermediate sheave. Thus there is small likelihood of dirt and foreign matter entering the interior of the pulley to the extent of fouling operation thereof.

Further assurance against failure by reason of having the intermediate sheave stick on the sleeve is afforded by making the sleeve of so-called oilless bearing stock, a material produced by the powder metallurgy process and characterized by a definite degree of porosity. In this way the outer surface of the sleeve on which the intermediate sheave slides is kept adequately lubricated by the lubricant which continuously exudes from its pores and is fed thereto by the wicks 14.

As will be readily apparent, the outer sheaves coact with the adjacent conical faces of the intermediate sheave to define pulleys adapted to accommodate V-belts 21 and 22. The effective diameters of these pulleys depend upon the position of the intermediate sheave with respect to the outer sheaves 15 and 16, and vary in inverse proportion. Thus, as the intermediate sheave 20 is moved axially, the speed ratio between the driving and driven members (not shown) over which the belts 21 and 22 are trained, will be varied correspondingly.

From the foregoing description taken in connection with the accompanying drawing, it will be readily apparent to those skilled in the art that this invention effects a material improvement in the construction of variable speed pulleys of the type wherein an intermediate double cone-faced sheave is axially slidable between cooperating outer single cone-faced sheaves, and that the invention particularly provides protection against fouling of the mechanism by excluding dirt and dust from the inner bearings, and by the same means provided therefor achieves added rigidity for the mounting of the intermediate sheave.

What I claim as my invention is:

1. In a variable speed pulley of the character described: a shaft adapted to be mounted horizontally and comprising a straight length of tubular material, the interior of which is adapted to form an oil reservoir; a plug at one end of said tube; an oil filler cap at the other end of said tube through which the reservoir is adapted to be filled; an air vent at said first named end of said shaft, near the top thereof; a sleeve rotatably journalled on said shaft; and a wooden wick passed through a hole in the wall of the tube and extending into the reservoir in its interior to bring oil from the reservoir to the bearing surfaces of the shaft and the sleeve.

2. The variable speed pulley of claim 1 further characterized by the fact that said plug and said oil filler cap are interchangeable to thus enable the oil reservoir to be in effect reversed end-for-end.

CHARLES McLEAR.

REFERENCES CITED

The following references are of record in the file of this patent:

UNITED STATES PATENTS

| Number | Name | Date |
|---|---|---|
| 553,621 | Kraus | Jan. 28, 1896 |
| 410,700 | Waggoner | Sept. 10, 1889 |
| 1,716,983 | Sharp | June 11, 1929 |
| 689,480 | Fowler | Dec. 24, 1901 |